(12) United States Patent
Brendel et al.

(10) Patent No.: US 9,129,738 B2
(45) Date of Patent: Sep. 8, 2015

(54) OIL-FILLED TRANSFORMER SWITCHING FRAME

(71) Applicant: ABB TECHNOLOGY AG, Zürich (CH)

(72) Inventors: Hartmut Brendel, Halle (DE); Matthias Starke, Kabelsketal (DE); Marikka Hübner, Halle (DE); Ralf Büchner, Halle (DE); Klaus Herkert, Mudau (DE); Isidoro Li Pira, Vettelschoβ (DE)

(73) Assignee: ABB TECHNOLOGY AG, Zürich (CH)

( * ) Notice: Subject to any disclaimer, the term of this patent is extended or adjusted under 35 U.S.C. 154(b) by 0 days.

(21) Appl. No.: 14/308,294

(22) Filed: Jun. 18, 2014

(65) Prior Publication Data

US 2015/0015355 A1   Jan. 15, 2015

(30) Foreign Application Priority Data

Jun. 18, 2013   (EP) .................................... 13003094

(51) Int. Cl.

| H01F 27/08 | (2006.01) |
|---|---|
| H01F 27/32 | (2006.01) |
| B32B 21/00 | (2006.01) |
| H01F 5/04 | (2006.01) |
| H01F 27/00 | (2006.01) |
| H01F 27/12 | (2006.01) |

(52) U.S. Cl.
CPC ............... *H01F 27/32* (2013.01); *B32B 21/00* (2013.01); *H01F 5/04* (2013.01); *H01F 27/00* (2013.01); *H01F 27/12* (2013.01); *H01F 27/322* (2013.01)

(58) Field of Classification Search
CPC ............................................ H01F 27/00–27/10
USPC ...................................................... 336/55–62
See application file for complete search history.

(56) References Cited

U.S. PATENT DOCUMENTS

| 3,195,084 | A | * | 7/1965 | Bock ................................ 336/60 |
| 3,302,149 | A | * | 1/1967 | Forsha ............................. 336/58 |
| 3,748,616 | A | * | 7/1973 | Weber et al. ..................... 336/60 |
| 3,921,112 | A | * | 11/1975 | Broverman ...................... 336/58 |
| 4,041,592 | A | * | 8/1977 | Kelm ....................... 29/890.034 |
| 8,471,662 | B2 | * | 6/2013 | Brendel et al. .................. 336/58 |

* cited by examiner

Primary Examiner — Tuyen Nguyen
(74) Attorney, Agent, or Firm — Buchanan Ingersoll & Rooney PC

(57) ABSTRACT

An oil-filled transformer switching frame is disclosed which includes at least one longitudinal channel element that is essentially formed by a wall that is curved in a U-shaped manner, for receiving in its inner region stranded conductors of an oil tank of an oil transformer. The wall of the channel element can include a first layer of mechanically strong, planar insulating material and a second layer of mechanically strong, planar insulating material that is adjacent to and fundamentally parallel to said first layer, the first layer and the second layer being connected to and spaced apart by a third layer of a mechanically strong, corrugated insulating material having hollow spaces that can be flooded with a fluid by way of lateral edges.

18 Claims, 4 Drawing Sheets

OIL-FILLED TRANSFORMER SWITCHING FRAME

RELATED APPLICATION

This application claims priority under 35 U.S.C. §119 to European Patent Application No. 13003094.4 filed in Europe on Jun. 18, 2013, the entire content of which is hereby incorporated by reference in its entirety.

FIELD

The present disclosure relates to an oil-filled transformer switching frame and an oil-filled transformer having an oil-filled transformer switching frame.

BACKGROUND INFORMATION

It is known that oil-filled transformers are used in extra-high voltage levels of by way of example 380 kV/110 kV. A transformer of this type can include by way of example a power rating of greater than 100 MVA and a weight in the region of by way of example 100 t and higher. Oil-filled transformers are characterized by virtue of the fact that the actual transformer is arranged in an oil tank that is filled with oil. The oil acts both as a cooling medium and also as an electrical insulating medium. The electrical connections of the actual transformer are guided through the oil-filled intermediate space between the tank and the transformer to the corresponding end line connections or rather connection sites. Care is to be taken that the lines are embodied and arranged in such a manner that sufficient electrical breakdown strength is provided. In principle, a greater gap between the transformer and the tank wall improves the breakdown strength but on the other hand the installation size of the transformer is increased in an extremely disadvantageous manner.

So-called battery systems have been provided on the high voltage side and the so-called battery systems encompass the respective end line tubes in a similar manner to that of a cylinder and thus improve the field distribution within the oil tank. Insulated lines or stranded conductors have been used for controlling the voltage of transformers, the control process mostly being performed on the high voltage-side, and the insulated lines or stranded conductors are guided for example in bundles between the tapping sites of a respective winding and an associated stepping switch. Stranded conductors of this type have been arranged in a self-supporting manner on so-called switching frames. Switching frames can include a multiplicity of vertical and horizontal strips in which the stranded conductors are clamped in a costly and laborious manner using rollers and small pressboard plates and they acquire their electrical strength exclusively from the insulation on the stranded conductors. As a result, large oil-filled gaps are used with respect to objects that have other potentials such as for example windings and this can increase the installation size of the oil tank.

Furthermore, switching frames are characterized by a very limited mechanical strength and are therefore susceptible to short-circuit forces. It is therefore known to mount vertical strips at intervals of less than 700 mm in order to be able to absorb any short-circuit forces that occur. The high number of strips that is used as a result prevents the distances to the windings from being increased and consequently promotes tracking path flashovers along the strips. Switching frames of this type involve a very labour intensive assembly process as a result of their type of construction and the high number of fastening parts.

SUMMARY

An oil-filled transformer switching frame is disclosed comprising: at least one longitudinal channel element that is essentially formed by a wall that is curved in a U-shaped manner, said channel element being configured for receiving stranded conductors of an oil tank of an oil transformer in an inner region of said channel element, said inner region being defined by the wall; a first layer of the wall of the channel element being formed of mechanically strong, planar insulating material; a second layer of the wall of the channel element being formed of mechanically strong, planar insulating material that is adjacent to and fundamentally parallel to said first layer; and a third layer, said first layer and said second layer being connected to and spaced apart by the third layer of a mechanically strong, corrugated insulating material that is arranged between said first layer and said second layer, wherein the third layer includes lateral edges and is corrugated such that the hollow spaces are formed by the corrugated shape that can be flooded with a fluid by way of the lateral edges.

BRIEF DESCRIPTION OF THE DRAWINGS

Further embodiments and further advantages are described in detail with reference to exemplary embodiments that are illustrated in the drawings, in which.

DETAILED DESCRIPTION

Figure 1:
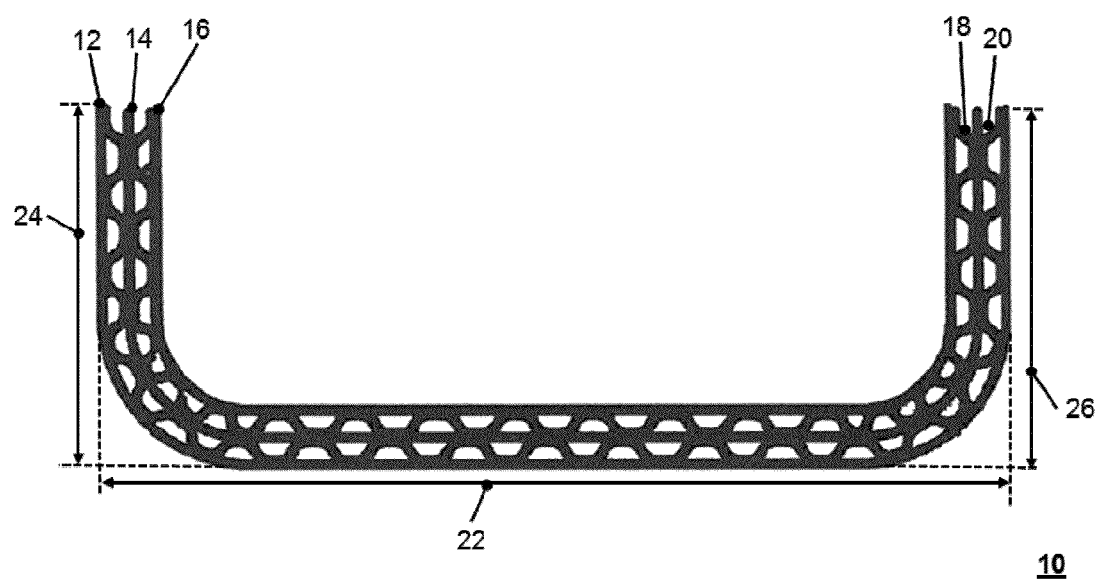
FIG. 1 illustrates a cross sectional view of an exemplary first channel element.

An oil-filled transformer switching frame is disclosed that is simpler to produce and is characterized by improved electrical and mechanical properties. A corresponding oil transformer is also disclosed.

An exemplary oil-filled transformer switching frame as disclosed can include at least one longitudinal channel element that is essentially formed by a wall that is curved in a U-shaped manner, and the channel element is provided for the purpose of receiving stranded conductors in the inner region of the channel element and the inner region is defined by the wall and the stranded conductors are arranged in an oil tank of an oil transformer, wherein the wall of the channel element can include a first layer of mechanically strong, planar insulating material and a second layer of mechanically strong, planar insulating material that is adjacent to and fundamentally parallel to the first said layer, the first layer and the second layer being connected to and spaced apart by a third layer of a mechanically strong, corrugated insulating material that is arranged between the first layer and the second layer; and wherein the third layer can include lateral edges and be corrugated in such a manner that the hollow spaces that are formed by the corrugated shape can be completely flooded with a fluid by way of the lateral edges.

As disclosed herein, a cable channel that has a U-shaped cross section, is provided for receiving and guiding stranded conductors and can be characterized by improved mechanical and electrical properties. The U-shaped cross sectional profile can provide a channel element with increased strength. As a consequence, it is possible from the mechanical point of view to use in each case a channel element as a, for example, horizontally extending and stabilizing supporting element in a switching frame, as a result of which known horizontal struts can be at least predominantly omitted in an advantageous manner. Any short-circuit forces that occur between multiple stranded conductors that are arranged in the same channel element are directly absorbed by the channel element and do not place any loading on the remaining switching frame. As a result, it is possible in an advantageous manner to reduce the number of the remaining support strips that are arranged in a vertical manner and form the switching frame. It is sufficient, by way of example, to support a channel element in an exemplary horizontal gap of approx. 2 m.

From the electrical point of view, an channel element as disclosed herein can be configured so as for its part to contribute likewise to the insulating strength of the entire arrangement. The multi-layer structure of planar and corrugated insulating material that is flooded with oil in the installed state can be characterized by an extraordinary insulating ability. Stranded conductors that are arranged in a U-shaped or rather also bath-shaped channel element can be protected by means of an increased tracking path along the wall of the channel element in an improved manner from electrical flashovers, such as in relation to the voltage-carrying components on the high voltage side. Consequently, it is possible to a great extent to prevent the strips being close to the winding potentials and to prevent possible dangers as a result of discharges along tracking paths.

An exemplary material thickness of a planar or rather corrugated insulating material—such as pressboard—amounts to by way of example 1 mm. The different layers of the insulating material are glued together. In an advantageous manner, a channel element of this type does not deform during a drying process under a vacuum.

Consequently, a switching frame as disclosed herein can reduce in an advantageous manner the outlay and can be characterized by improved mechanical and electrical properties. As a consequence, it can be rendered possible in a particularly advantageous manner by way of example also to reduce the installation size of an oil tank of an oil-filled transformer whilst maintaining identical electrical properties.

In accordance with an exemplary preferred embodiment of an oil-filled transformer switching frame as disclosed herein, at least one meshing element that is positioned facing the opening of the U-shaped cross section can be provided in the inner region of the at least one channel element in a transverse manner with respect to its longitudinal extension for the purpose of fixing stranded conductors.

The stranded conductors or rather cables can be fixed in the channel element by, for example, means of milled meshing elements that are manufactured by way of example from pressboard. The meshing elements can be arranged by way of example in the channel element at intervals of approx. 300 mm and are fastened by means of a suitable adhesive such as casein. Exemplary spacing between adjacent teeth of the meshing element corresponds ideally approx. to the diameter of a cable or also to a multiple of cables. As a consequence, the cables can be pulled through or rather pressed into meshing elements of this type in a very easy manner and yet the cables are fixed securely. The spacing that is provided between adjacent cables by means of the teeth of the meshing element can provide in an advantageous manner additional cooling of the cable by means of the transformer oil that is surrounding said cables.

According to a further exemplary variant, a spacer that extends between the opposite-lying wall regions and in a transverse manner with respect to the meshing element can be arranged in the inner region of the at least one channel element so that stranded conductors can be fixed in multiple planes that are spaced apart from one another. The installation of spaces of this type parallel to the cables renders it possible to change in each case individually the extent to which a cable is cooled by means of the transformer oil that is surrounding the cable and also to adjust the cooling process to suit particular thermal conditions. According to an example for guiding cables by way of example stranded conductors in a channel element, six cables are guided in each case in two planes and, as a consequence, the channel element is considerably wider than it is tall. However, numerous other types of arrangement are possible depending upon the prevailing boundary conditions.

In accordance with a further exemplary variant, a respective spacer can be also embodied in a toothed-like manner and the spacer meshes with the meshing element. As a consequence, a type of latching element is formed that is suitable in a particular manner for fixing and provide a space between cables that are guided in the channel element.

In a further exemplary embodiment of the oil-filled transformer switching frame in accordance with the present invention, at least one fixing clamp is provided that is manufactured from an insulating material such as pressboard and is for example detachable, and the fixing clamp encompasses a section of the channel element in its cross section. As a consequence, it can be ensured under unfavourable short-circuit conditions that the cables are securely fixed in the respective channel element. It is, for example, preferred that an associated fixing clamp that encompasses the corresponding section of the channel element is also provided for each meshing element. As a consequence, it can be ensured that the cables that are guided in the channel element are spaced apart and fixed in a particularly secure manner.

In an exemplary preferred form, a fixing clamp can include screw elements that are manufactured from an insulating material, by way of example from milled pressboard. As a consequence, the clamp can be arranged around a channel element in a simple manner and as a consequence the assembly outlay is reduced in an advantageous manner.

In accordance with an exemplary preferred embodiment of the oil-filled transformer switching frame as disclosed herein, the wall of the channel element can include a fourth layer of a corrugated insulating material and a fifth layer of a planar insulating material and the layers are arranged in each case in an alternating manner. As a consequence, both the mechanical stability and also the electrical insulating ability of a channel element can be advantageously increased.

In an alternate embodiment, an oil-filled transformer can include an oil tank and a transformer that is arranged in said oil tank, wherein an oil-filled transformer switching frame in accordance with the present disclosure can be arranged in the oil chamber that is formed between the tank wall and the transformer.

An oil-filled transformer of this type can be simple to produce and have particularly good mechanical and insulating properties with respect to its internal cable guide. Depending upon the particular embodiment, the spacing between the cables and the windings can be reduced in comparison to known spacing by, for example, approx. 20 mm in dependence upon the dimensions and voltage levels.

In accordance with an exemplary preferred embodiment of an oil-filled transformer in accordance with the present disclosure, the at least one channel element is arranged in such a manner that its U-shaped profile is open towards the respective adjacent region of the tank wall. A cable channel is for example considerably wider than it is tall. By virtue of arranging the cable channel in a vertical manner with the cables fixed therein, an arrangement of cables can be consequently achieved that is similar to a stack that involves considerably less space in a planar extension between the tank wall and the transformer than in the vertical extension. As a consequence, the spacing that is between the tank wall and transformer for insulating purposes can be advantageously kept small. A construction of this type having a barrier structure through which oil is flowing can have a very high electrical strength with respect to potentials that are located on the side that is remote from the U-shaped profile. Furthermore, the strength with respect to discharges along the tracking path can be increased in an advantageous manner by virtue of the U-shaped profile.

In accordance with a further exemplary embodiment of the oil-filled transformer in accordance with the present disclosure, the at least one channel element can be arranged approx. horizontally along the extension of the oil-filled transformer and is mounted at specific intervals on supporting elements, wherein the respective spacing between the supporting elements and the cross section and the wall thickness of the at least one channel element are tailored to suit one another in such a manner that sufficient flexural strength is provided when respective stranded conductors are arranged in the inner space of the channel element. The U-shaped profile produces a carrier-type structure that renders it possible to provide a greater spacing between the supporting elements by way of example in each case 2 m. It is possible by further increasing the height of the side walls of the channel elements to also increase the width of the channel element. An exemplary channel cross section amounts by way of example to 15 cm in height and 40 cm in width in the case of a length of 2 m.

In accordance with a further exemplary embodiment of the oil-filled transformer in accordance with the present disclosure, the supporting elements are embodied in a manner similar to a column and are manufactured from an insulating material such as pressboard. An exemplary contour of a column-like supporting element of this type is by way of example square with an edge length of 10 cm. In an exemplary manner, multiple circumferential slits are milled along the extension of the supporting element so that the tracking path can be extended in an advantageous manner along the supporting element.

FIG. 1 illustrates a cross sectional view of an exemplary first channel element 10. The channel element 10 is formed essentially from (e.g., consists of) a U-shaped curved wall that for its part includes three layers 12, 14, 16 of a planar insulating material and alternating two layers 18, 20 of a corrugated insulating material are provided between the layers. The term "corrugated" is also to be understood to mean by way of example a trapezoidal shape. In the case of an assumed material thickness of 1 mm and an assumed height in each case of 2 mm for the intermediate spaces that are formed by means of the wave structure, an exemplary wall thickness of 9 mm is produced. The width of the channel element 10 is indicated by the reference numeral 22 and amounts by way of example to 45 cm. The respective heights of the lateral sections are indicated by the reference numerals 26 and amount by way of example to 18 cm.

Figure 2:
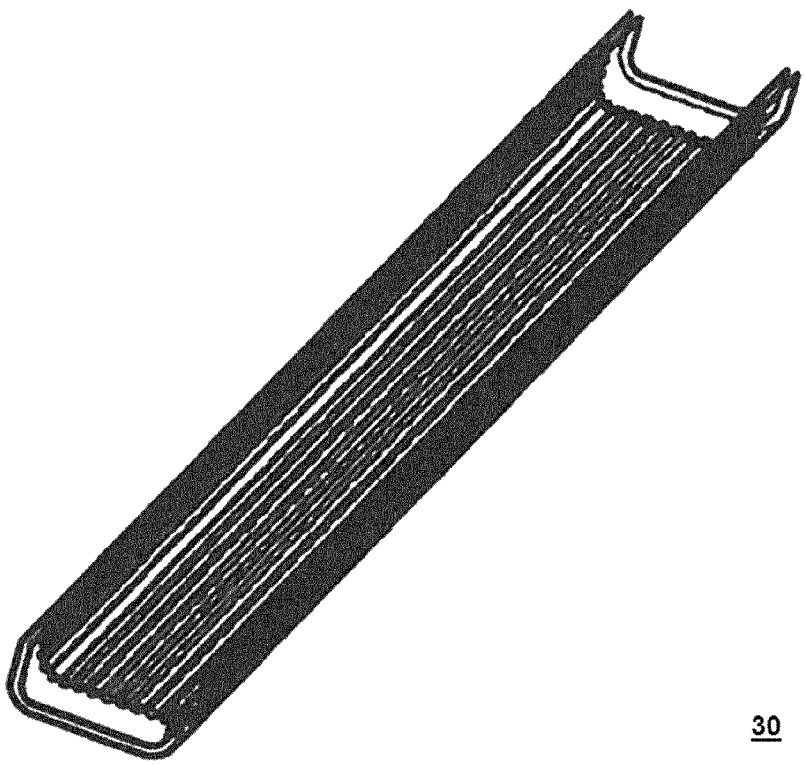
FIG. 2 illustrates a three dimensional view of an exemplary second channel element.

FIG. 2 illustrates a three dimensional view of an exemplary second channel element 20, wherein for illustration purposes the uppermost layer is in part not illustrated so that a corrugated layer of insulating material that is located below the uppermost layer is evident.

Figure 3:
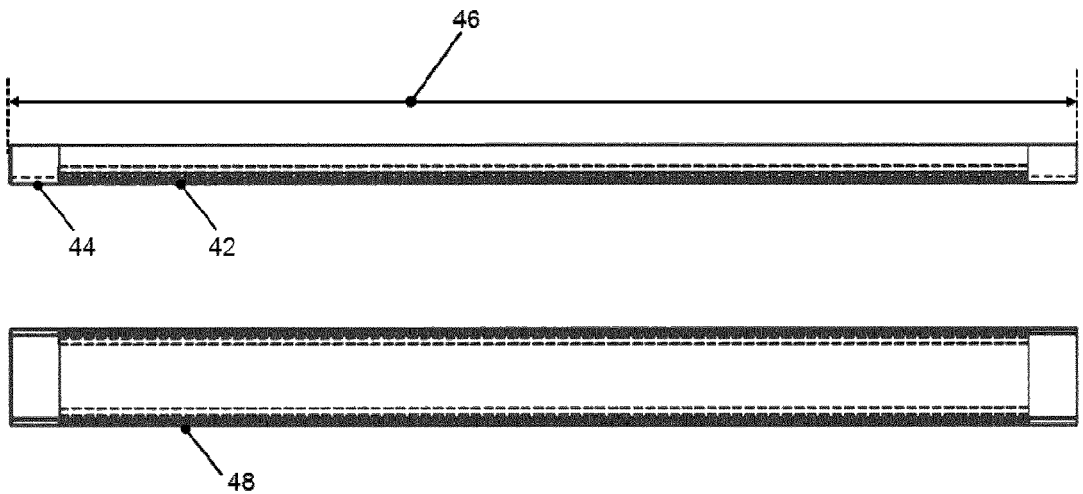
FIG. 3 illustrates a lateral view and a plan view of an exemplary third channel element.

FIG. 3 illustrates a lateral view 42 and a plan view 48 of an exemplary third channel element 40. The length of the channel element 40 is indicated by the reference numeral 46 and amounts by way of example to 2.5 m. Respective end regions 44 with reduced height of the side walls are provided on the axial ends of the channel element. As a consequence, the process of assembling a channel element can be advantageously simplified.

Figure 4:
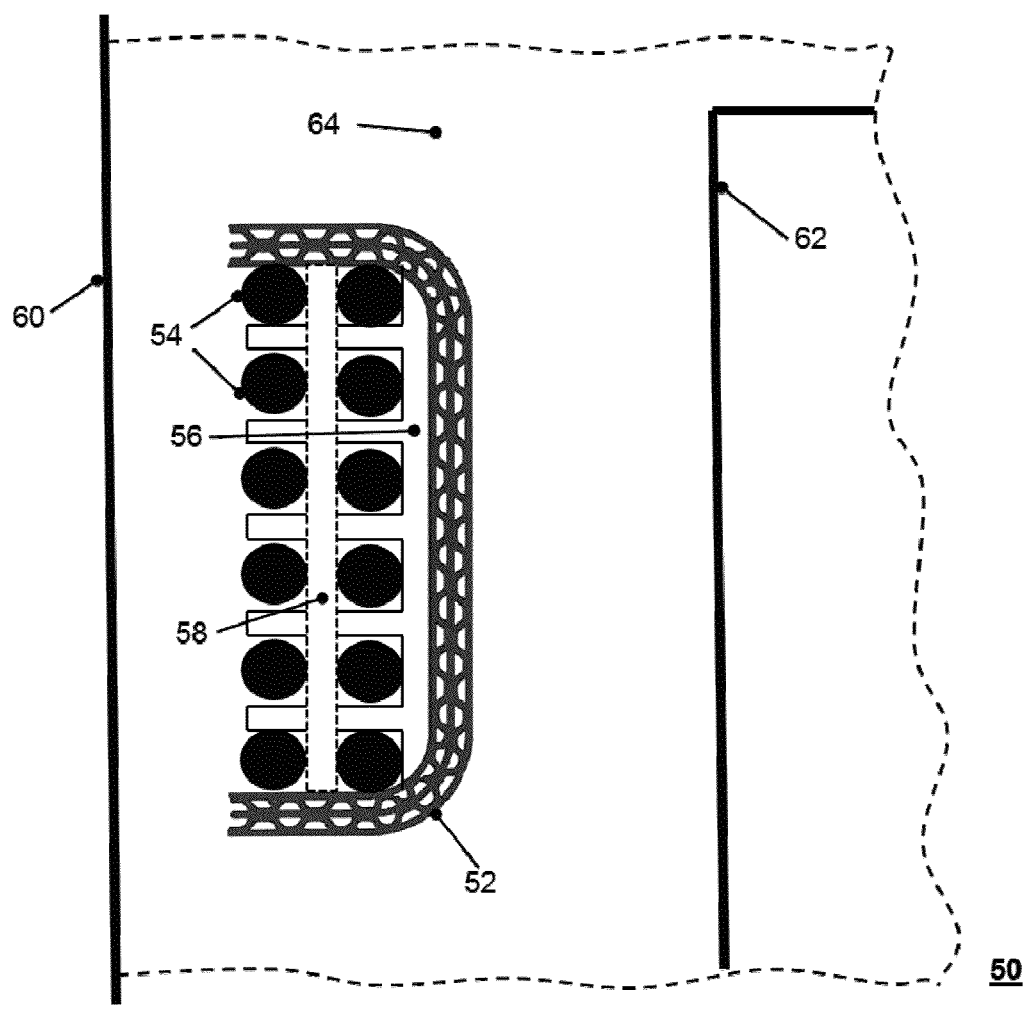
FIG. 4 illustrates an exemplary arrangement of an exemplary fourth channel element in an oil-filled transformer.

FIG. 4 illustrates an exemplary arrangement 50 of a fourth channel element 52 in an oil-filled transformer. A transformer 62 is arranged in an oil tank. An oil chamber 64 that is flooded with oil is formed between the wall 60 of the oil tank and the transformer 62 and the channel element 52 is arranged in the oil chamber with the opening of the channel element facing the wall 60. A meshing element 56 and a spacer that is arranged in a transverse manner to the meshing element and meshes with the meshing element is located in the inner space of the channel element so that in total twelve holding positions are formed in which stranded conductors 54 are fixed. The insulating spacing between the stranded conductors and the transformer can be reduced in an advantageous manner by virtue of arranging the channel element 52 with its opening facing the tank wall 60.

Figure 5:
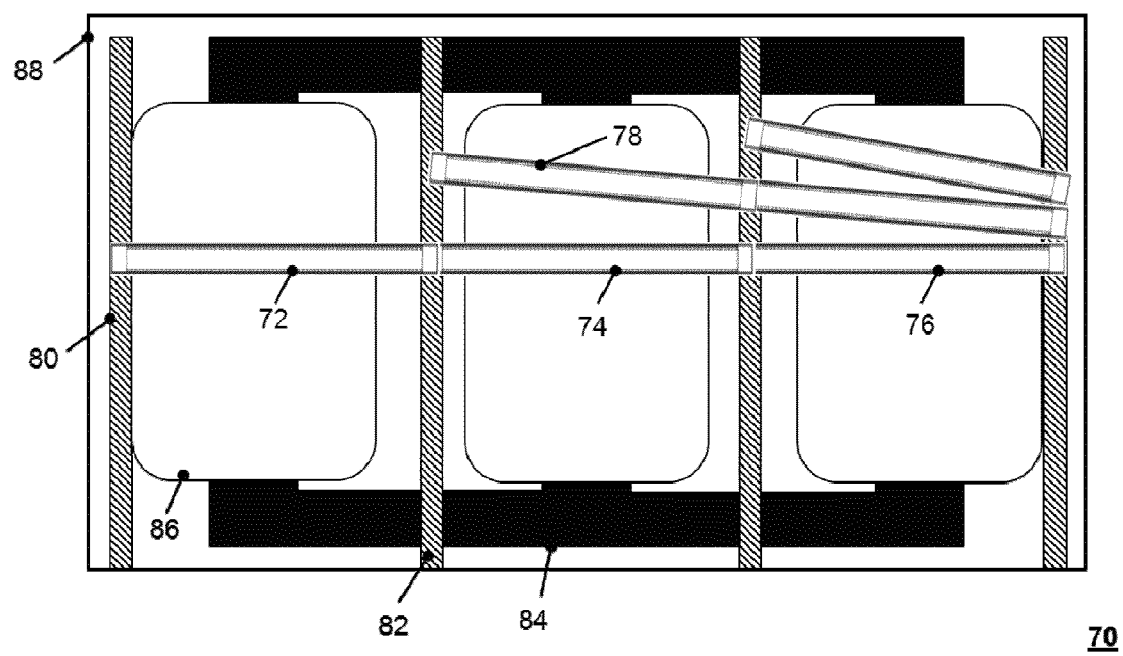
FIG. 5 illustrates an exemplary oil-filled transformer with a switching frame.

FIG. 5 illustrates an exemplary oil-filled transformer 70 with a switching frame. A transformer having a transformer core 84 and multiple transformer coils 86 are arranged in an oil tank 88. Low voltage-side tapping sites of the transformer coils 86 can be guided by means of stranded conductors to a respective stepping switch on the right-hand side of the oil-filled transformer 70. A switching frame for guiding the stranded conductors can be provided in the intermediate space between the transformer and the wall of the oil tank 88 and the switching frame can essentially include (e.g., consist of) multiple column-like supporting elements 80, 82 and channel elements 72, 74, 76, 78 that extend in an approx. horizontal manner. The stable design of the channel elements 72, 74, 76, 78 renders it possible to a great extent to omit horizontal supporting strips of the switching frame and the spacing between the supporting elements 80, 82 can be increased without the mechanical stability of the switching frame being impaired.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE NUMERALS

10 A cross sectional view of an exemplary first channel element
12 First layer of planar insulating material
14 Second layer of planar insulating material
16 Fifth layer of planar insulating material
18 Third layer of corrugated insulating material
20 Fourth layer of corrugated insulating material
22 Width of the first channel element
24 First-side height of the first channel element 26 Second-side height of the first channel element
30 A three dimensional view of the second channel element
40 A lateral view and plan view of a third channel element
42 A lateral view of a third channel element
44 End region of the third channel element
46 Length of the third channel element
48 A plan view of the exemplary third channel element
50 Exemplary arrangement of a fourth channel element in an oil-filled transformer
52 Exemplary fourth channel element
54 Stranded conductors
56 Exemplary meshing element
58 Exemplary spacer
60 Tank wall
62 Transformer
64 Oil chamber
70 Exemplary oil-filled transformer having a switching frame
72 Fifth channel element
74 Sixth channel element
76 Seventh channel element
78 Eighth channel element
80 Exemplary first supporting element
82 Exemplary second supporting element
84 Transformer core
86 Exemplary transformer coil
88 Oil tank

The invention claimed is:

1. An oil-filled transformer switching frame, comprising:
at least one longitudinal channel element that is essentially formed by a wall that is curved in a U-shaped manner, said channel element being configured for receiving stranded conductors of an oil tank of an oil transformer in an inner region of said channel element, said inner region being defined by the wall;
a first layer of the wall of the channel element being formed of mechanically strong, planar insulating material;
a second layer of the wall of the channel element being formed of mechanically strong, planar insulating material that is adjacent to and fundamentally parallel to said first layer; and
a third layer, said first layer and said second layer being connected to and spaced apart by the third layer of a mechanically strong, corrugated insulating material that is arranged between said first layer and said second layer, wherein the third layer includes lateral edges and is corrugated such that the hollow spaces are formed by the corrugated shape that can be flooded with a fluid by way of the lateral edges.

2. The oil-filled transformer switching frame according to claim 1, comprising:
at least one meshing element that is positioned facing the opening of the U-shaped cross section and that is provided in the inner region of the at least one channel element in a transverse manner with respect to its longitudinal extension for fixing stranded conductors.

3. The oil-filled transformer switching frame according to claim 2, comprising:
at least one spacer, that extends between opposite-lying wall regions and in a transverse manner with respect to the meshing element, arranged in the inner region of the at least one channel element so that stranded conductors can be fixed in multiple planes that are spaced apart from one another.

4. The oil-filled transformer switching frame according to claim 3, wherein the spacer is embodied in a toothed-like manner and is meshed with the meshing element.

5. The oil-filled transformer switching frame according to claim 1, comprising:
at least one fixing clamp that is manufactured from an insulating material, wherein and said fixing clamp encompasses a section of the channel element in its cross section.

6. The oil-filled transformer switching frame according to claim 5, wherein the at least one fixing clamp comprises:
screw elements that are manufactured from an insulating material.

7. The oil-filled transformer switching frame according to claim 1, wherein the wall of the channel element comprises:
a fourth layer of a corrugated insulating material; and
a fifth layer of a planar insulating material.

8. An oil-filled transformer comprising:
an oil tank containing plural stranded conductors;
a transformer that is arranged in said oil tank; and
an oil-filled transformer switching frame according to claim 1 arranged in an oil chamber that is formed between the tank wall and the transformer, the channel element of the oil-filled transformer switching frame receiving the stranded conductors.

9. The oil-filled transformer according to claim 8, wherein the at least one channel element is arranged in such a manner that its U-shaped profile is open towards a respective adjacent region of the tank wall.

10. The oil-filled transformer according to claim 8, wherein the at least one channel element is arranged in an approximately horizontal manner and mounted at specific intervals on supporting elements, wherein a respective spacing between the supporting elements and also a cross section and wall thickness of the at least one channel element are selected to provide sufficient flexural strength when the stranded conductors are arranged in the inner region of the channel element.

11. The oil-filled transformer according to claim 10, wherein the support elements are embodied in a manner similar to a column and are manufactured from an insulating material.

12. The oil-filled transformer switching frame according to claim 4, comprising:
at least one fixing clamp that is manufactured from an insulating material, wherein and said fixing clamp encompasses a section of the channel element in its cross section.

13. The oil-filled transformer switching frame according to claim 12, wherein the at least one fixing clamp comprises:
screw elements that are manufactured from an insulating material.

14. The oil-filled transformer switching frame according to claim 13, wherein the wall of the channel element comprises:
a fourth layer of a corrugated insulating material; and
a fifth layer of a planar insulating material.

15. An oil-filled transformer comprising:
an oil tank containing plural stranded conductors;
a transformer that is arranged in said oil tank; and
an oil-filled transformer switching frame according to claim 14 arranged in an oil chamber that is formed between the tank wall and the transformer, the channel element of the oil-filled transformer switching frame receiving the stranded conductors.

16. The oil-filled transformer according to claim 15, wherein the at least one channel element is arranged in such a manner that its U-shaped profile is open towards a respective adjacent region of the tank wall.

17. The oil-filled transformer according to claim 16, wherein the at least one channel element is arranged in an approximately horizontal manner and mounted at specific intervals on supporting elements, wherein a respective spacing between the supporting elements and also a cross section and wall thickness of the at least one channel element are selected to provide sufficient flexural strength when the stranded conductors are arranged in the inner region of the channel element.

18. The oil-filled transformer according to claim 17, wherein the support elements are embodied in a manner similar to a column and are manufactured from an insulating material.

* * * * *